US006249557B1

(12) United States Patent
Takatori et al.

(10) Patent No.: US 6,249,557 B1
(45) Date of Patent: Jun. 19, 2001

(54) APPARATUS AND METHOD FOR PERFORMING TIMING RECOVERY

(75) Inventors: Hiroshi Takatori; Stanley K. Ling; Amit Gattani, all of Sacramento; John R. Camagna, El Dorado Hills, all of CA (US)

(73) Assignee: Level One Communications, Inc., Sacramento, CA (US)

( * ) Notice: Subject to any disclaimer, the term of this patent is extended or adjusted under 35 U.S.C. 154(b) by 0 days.

(21) Appl. No.: 09/033,769

(22) Filed: Mar. 3, 1998

Related U.S. Application Data (60) Provisional application No. 60/039,802, filed on Mar. 4, 1997.

(51) Int. Cl.[7] .................................................. H04L 7/00
(52) U.S. Cl. ........................ 375/355; 375/354; 375/373; 375/325; 375/326
(58) Field of Search .................................... 375/373, 376, 375/375, 326, 327, 354, 293, 234, 355; 360/46; 369/59

(56) References Cited

U.S. PATENT DOCUMENTS

| 3,516,007 | 6/1970 | Bos et al. |
|---|---|---|
| 3,697,689 | * 10/1972 | Gibson ................................ 375/373 |

(List continued on next page.)

FOREIGN PATENT DOCUMENTS 0 368 307   5/1990   (EP) .

OTHER PUBLICATIONS

Hodkiss, W., "Equaliser—Based Clock Extraction for Modems", *Electronics Letters,* vol. 30, No. 16, Aug. 4, 1994, pp. 1277–1279.

(List continued on next page.)

*Primary Examiner*—Stephen Chin
*Assistant Examiner*—Shuwang Liu
(74) *Attorney, Agent, or Firm*—Merchant & Gould P.C.

(57) ABSTRACT

A timing recovery circuit is disclosed that prevents phase error over-compensation. The timing recovery circuit includes a phase scanner for determining when phase error over-compensation has occurred and generating a signal for preventing dual phase compensation in response thereto thereby providing an accurate recovered clock signal. The timing recovery circuit also includes a feed-forward equalizer having a plurality of taps providing coefficients for filtering and adapting the input timing recovery circuit to an input signal. The phase scanner compares the tap coefficients to generate signal for preventing phase over-compensation by the feed-forward equalizer. A phase detector is provided for sampling coefficients from the feed-forward equalizer, error signals and output data and generating a phase signal used to generating the recovered clock signal. The signal for preventing phase over-compensation is mixed with the phase signal to generate the recovered clock signal.

17 Claims, 7 Drawing Sheets

U.S. PATENT DOCUMENTS

| | | |
|---|---|---|
| 3,731,219 | 5/1973 | Mader et al. . |
| 3,798,576 | 3/1974 | Torpie et al. . |
| 3,931,585 | 1/1976 | Barker et al. . |
| 3,992,580 | 11/1976 | Bittel et al. . |
| 4,004,226 | 1/1977 | Qureshi et al. ............... 375/355 |
| 4,091,335 | 5/1978 | Giolma et al. . |
| 4,129,748 | 12/1978 | Saylor . |
| 4,154,985 | 5/1979 | Munter . |
| 4,230,911 | 10/1980 | Fellinger et al. . |
| 4,242,639 | 12/1980 | Boone . |
| 4,270,183 | 5/1981 | Robinson et al. . |
| 4,303,837 | 12/1981 | Ansaldi et al. . |
| 4,334,313 | 6/1982 | Gitlin et al. ............... 375/231 |
| 4,360,788 | 11/1982 | Erps et al. . |
| 4,456,890 | 6/1984 | Carickhoff . |
| 4,490,688 | 12/1984 | Borras et al. . |
| 4,494,242 | 1/1985 | Ehrenbard et al. . |
| 4,520,489 | 5/1985 | Hogge, Jr. . |
| 4,535,451 | 8/1985 | Drupsteen . |
| 4,539,531 | 9/1985 | Thomas et al. . |
| 4,551,845 | 11/1985 | ab der Halden et al. . |
| 4,565,976 | 1/1986 | Campbell . |
| 4,584,695 | 4/1986 | Wong et al. . |
| 4,633,488 | 12/1986 | Shaw . |
| 4,667,168 | 5/1987 | Shiomi et al. . |
| 4,694,259 | 9/1987 | Carickhoff et al. . |
| 4,700,359 | 10/1987 | Loscher . |
| 4,706,040 | 11/1987 | Mehrgardt . |
| 4,712,223 | 12/1987 | Nelson . |
| 4,712,224 | 12/1987 | Nelson . |
| 4,716,575 | 12/1987 | Douros et al. . |
| 4,733,197 | 3/1988 | Chow . |
| 4,771,251 | 9/1988 | Allen et al. . |
| 4,791,386 | 12/1988 | Shiga . |
| 4,805,197 | 2/1989 | Van Der Jagt et al. . |
| 4,805,198 | 2/1989 | Stern et al. . |
| 4,855,683 | 8/1989 | Troudet et al. . |
| 4,860,288 | 8/1989 | Teske et al. . |
| 4,862,485 | 8/1989 | Guinea et al. . |
| 4,896,334 | 1/1990 | Sayar . |
| 4,941,156 | 7/1990 | Stern et al. . |
| 4,972,442 | 11/1990 | Steierman . |
| 4,975,660 | 12/1990 | Svenson . |
| 5,059,924 | 10/1991 | JenningsCheck . |
| 5,068,628 | 11/1991 | Ghoshal . |
| 5,159,291 | 10/1992 | Ghoshal . |
| 5,181,228 | 1/1993 | Takatori . |
| 5,325,400 | 6/1994 | Co et al. . |
| 5,577,079 * | 11/1996 | Zenno et al. ............... 375/373 |
| 5,581,585 | 12/1996 | Takatori et al. ............... 375/326 |
| 5,966,258 * | 10/1999 | Bliss ............... 360/46 |
| 5,995,465 * | 11/1999 | Hayashi et al. ............... 369/59 |

OTHER PUBLICATIONS

Copy of International Search Report re counterpart Application No. PCT/US98/04179.

Best, R. E., "Phase–Locked Loops: Theory, Design, & Applications" McGraw–Hill Book Company, pp. 69–110 (Copyright 1984).

Shih, C.C. et al., "Jitter Attenuation Phase Locked Loop Using Switched Capacitor Controlled Crystal Oscillator", Proceedings of the Custom Integrated Circuits Conference: Rochester Plaza, Rochester, New York, 4 pages (May 16–19, 1988).

Yarak, D. et al., "Session XII: Communication Links", IEEE International Solid–State Circuits Conference, 3 pages (Feb. 14, 1985).

* cited by examiner

APPARATUS AND METHOD FOR PERFORMING TIMING RECOVERY

This application claim benefit to U.S. provisional application No. 60/039,802 Mar. 4, 1997.

BACKGROUND OF THE INVENTION

1. Field of the Invention

This invention relates in general to a timing recovery system and method, and more particularly to a phase-locked loop timing recovery system and method which is highly effective in eliminating re-activation.

2. Description of Related Art

At a receiver in a typical communication system, an analog-to-digital converter is utilized to convert a received continuous-time signal into a discrete-time format. One problem which is encountered in this type of system is that the local receiver clock and the remote transmitter clock are asynchronous. If the receiver clock is slower than the transmitter clock, after a long enough period of time, one sample of the received continuous-time signal will be lost. On the other hand, if the local receiver clock is faster than the remote transmitter clock, after a long enough period of time, an extra sample of the received continuous-time signal will be obtained. Thus, the problem of recovering the clock signal is an important problem in many communication systems.

Recently, several high speed digital data services have become commercially available. These high speed digital data services are known as the ISDN(Integral Services Digital Network) basic rate, HDSL(High Speed Digital Subscriber Loop), HDSL2(High Speed Digital Subscriber Loop 2), ADSL(Asymmetric Digital Subscriber Loop), and T1 services.

In these transmission system, the transceiver needs to recover the clock signal to provide the high speed services. In particular, a phase-locked loop (PLL) is need to obtain the clock signal. At the slave side(normally called Remote side, RT), the loop timing needed to be acquired from the received signal sent from the master side(normally called Central Office side, CO). The RT transmitter sends back a signal to the CO side with the synchronous time base acquired in its receiver phase-locked loop. Further, some systems use the signal carrierless AM/PM (CAP) or quadrature amplitude modulation (QAM) signal as the line code, which is very effective when the cable loss is heavily distorted due to skin effect of the cable and the open-ended stub, bridged taps.

Figure 1:
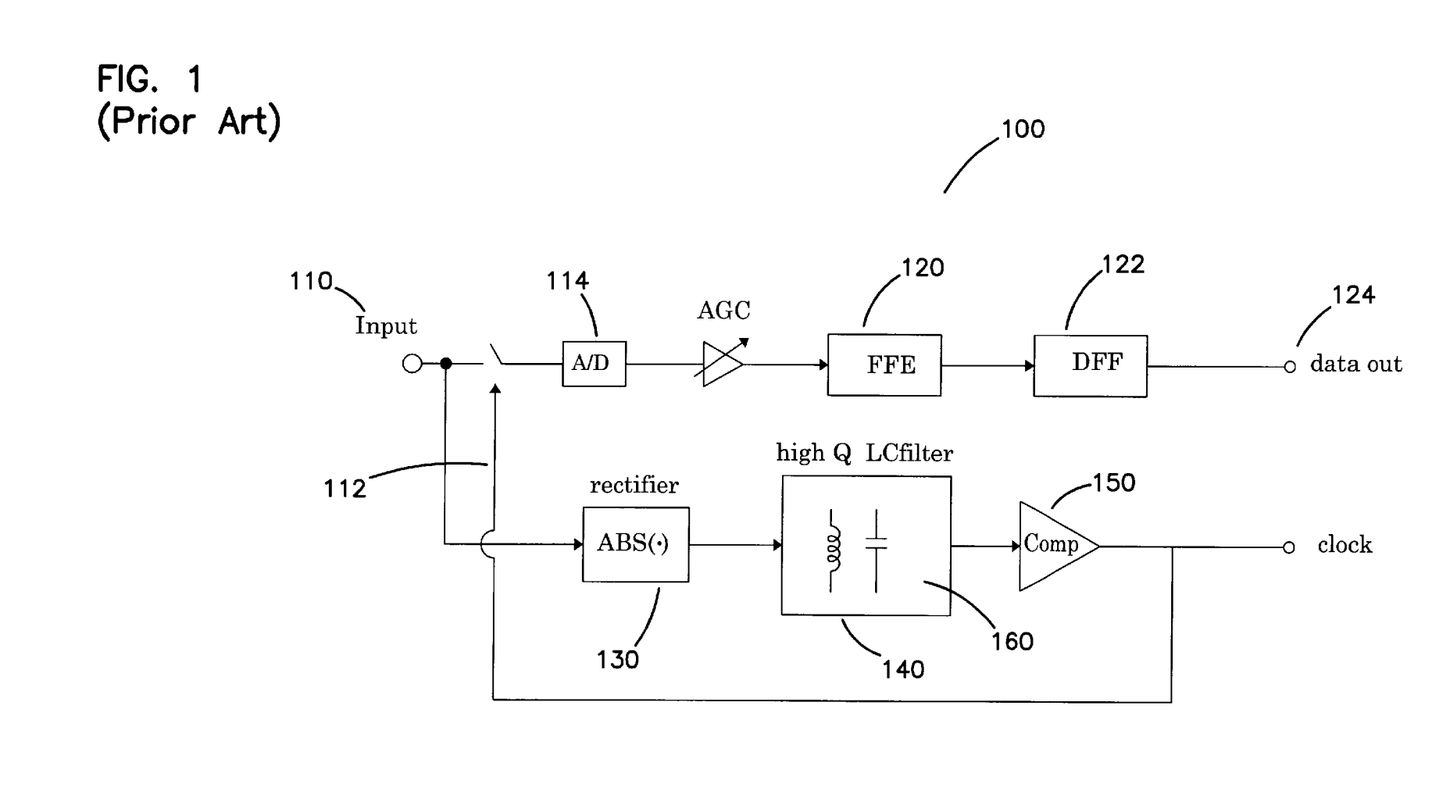
FIG. 1 illustrates a first prior phase-locked loop method.

One prior phase-locked loop method 100 is illustrated in FIG. 1. In FIG. 1, an input signal 110 is sampled according to a clock signal 112 and input to an analog-to-digital converter 114. The digital output of the analog-to-digital converter 114 is passed through the feed-forward equalizer 120 and the decision feedback equalizer 122 to produce the output data 124. To recover the clock signal 112, the input is sampled and rectified by the rectifier 130. Then the rectified signal is passed through a high Q bandpass filter 140. The output of the bandpass filter 140 is then passed to a comparator 150 for determining the clock signal based upon, for example, a comparison of the output of the bandpass filter and a threshold signal.

The phase-locked loop circuit 100 in FIG. 1 needs a high-Q bandpass filter 140 to extract the carrier component of the input signal 110. However, this method is not practical to implement with CMOS circuitry, since highly accurate LC components 160 that are needed to achieve the high Q bandpass filter 140 can not be accurately controlled by the current CMOS technology. Hence, such a system 100 needs expensive external components.

Figure 2:
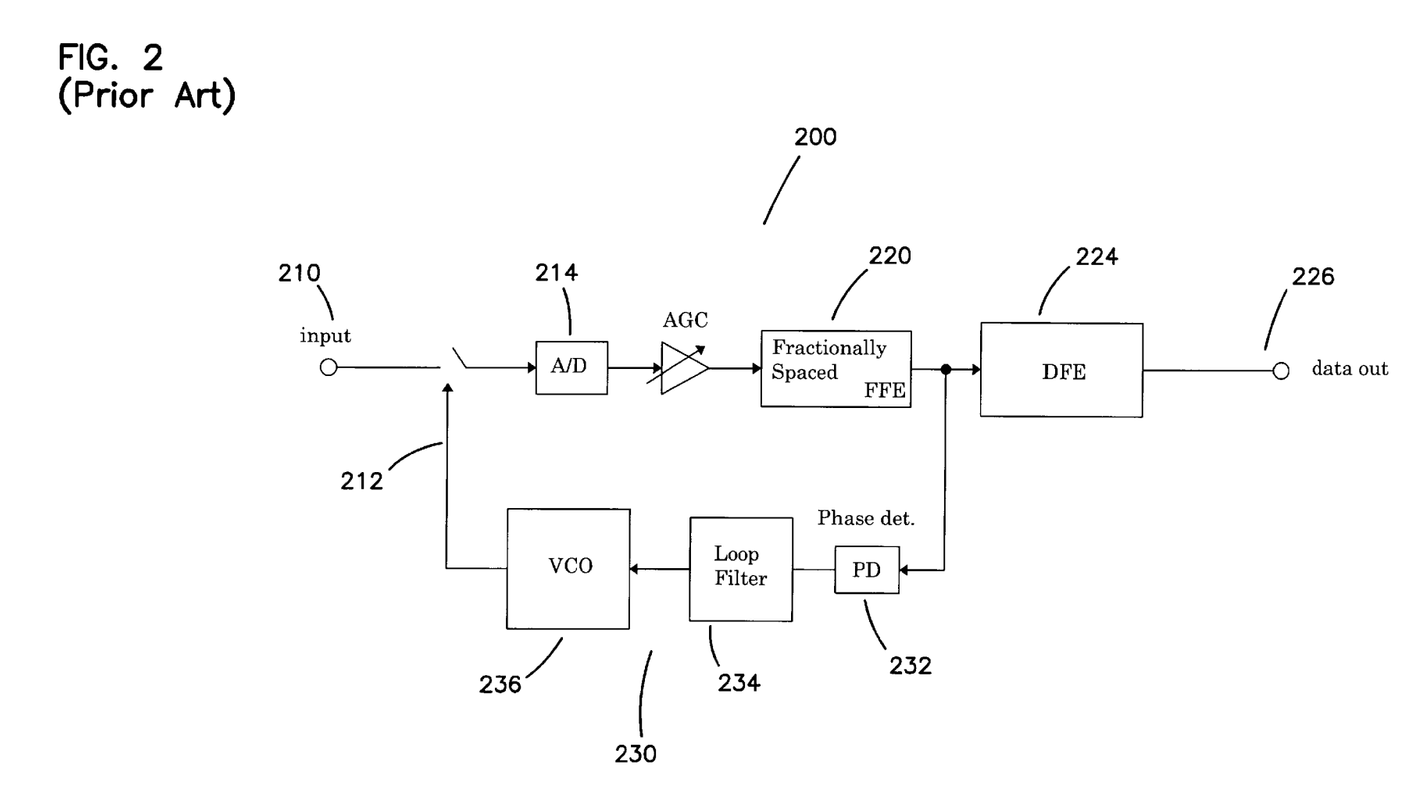
FIG. 2 illustrates a second prior phase-locked loop method.

Yet another prior method 200 is illustrated in FIG. 2. The phase-locked loop circuit 200 illustrated in FIG. 2 shows the sampling of an input signal 210 according to a derived clock signal 212, which is then provided to an analog-to-digital converter 214. The digital output of the analog-to-digital converter is passed through the fractionally spaced feed-forward equalizer 220 and the decision feedback equalizer 224 to produce the output data.

The output of the fractionally spaced feed-forward equalizer 220 provides an input to the phase-locked loop 230. From the output of the fractionally spaced feed-forward equalizer 224, the phase is determined by a phase detector 232 which is then passed through a loop filter 234. The loop filter 234 controls a voltage-controlled oscillator 236 to generate the clock signal 212.

However, the fractionally spaced feed-forward equalizer 220 tends to adjust phase error by itself, i.e., the fractionally spaced feed-forward equalizer 220 only needs the frequency adjustment. However, the phase-locked loop 230 also tries to detect and adjust for phase error. Therefore, this dual phase error compensation via the two paths fight each other and do not converge. Thus, this method requires re-acquisition because of the meta-stability caused by the mutual interaction between phase-locked loop 230 and the feed-forward equalizer 224.

Regarding this meta-stability, the feed-forward equalizer 224 has to be a fractionally spaced feed forward equalizer (FFE) to achieve high transmission quality of the bit error rate performance under the hash cable environment described above. The fractional spaced feed forward equalizer is basically finite impulse response (FIR) filter. Since, the FIR filter is fractionally spaced, i.e., the input is sampled N times faster than the symbol speed and fed to the FIR which has the unit delay of Tsymbol/N, where Tsymbol is the symbol period, the timing is self-adjusted. Therefore, it is not easy to extract correct timing information from the equalizer parameters.

It can been seen, then, that there is a need for an effective technique to acquire timing in digital data network.

It can be seen that there is a need for a phase-locked loop and method that is implemented using current CMOS circuit technology and which is highly effective in eliminating re-activation.

SUMMARY OF THE INVENTION

To overcome the limitations in the prior art described above, and to overcome other limitations that will become apparent upon reading and understanding the present specification, the present invention discloses a phase-locked loop timing recovery system and method which is highly effective in eliminating re-activation.

The present invention solves the above-described problems by providing a timing recovery circuit that prevents phase error over-compensation.

A system in accordance with the principles of the present invention includes a phase scanner for determining when phase error over-compensation has occurred and generating a signal for preventing dual phase compensation in response thereto thereby providing an accurate recovered clock signal.

Other embodiments of a system in accordance with the principles of the invention may include alternative or optional additional aspects. One such aspect of the present invention is that the timing recovery circuit includes a feed-forward equalizer having a plurality of taps providing coefficients for filtering and adapting the input timing recovery circuit to an input signal.

Another aspect of the present invention is that the phase scanner compares the tap coefficients to generate a signal for preventing phase over-compensation by the feed-forward equalizer.

Another aspect of the present invention is that the timing recovery circuit further includes a phase detector for sampling coefficients from the feed-forward equalizer, error signals and output data and generating a phase signal used to generating the recovered clock signal.

Another aspect of the present invention is that the signal for preventing phase over-compensation is mixed with the phase signal to generate the recovered clock signal.

Yet another aspect of the present invention is that the feed-forward equalizer is a fractionally spaced feed-forward equalizer.

Another aspect of the present invention is that the phase scanner further includes a comparator for comparing two taps from the feed-forward equalizer to generate a comparator output signal indicating whether over-compensation by the feed-forward equalizer has occurred, the comparator output signal being mixed with a scan phase signal to generate the signal for preventing phase over-compensation by the feed-forward equalizer.

Another aspect of the present invention is that the phase detector further includes a first circuit for processing a center tap from the feed-forward equalizer and a reference signal to generate a first control signal and a second circuit for processing the error signals and the data output signal to generate a second control signal, the first and second control signal being combined to produce the phase control signal.

Still another aspect of the present invention is that the second circuit further includes a first mixer for combining a first error signal and a first data signal to produce a first product signal and a second mixer for combining a second error signal and a second data signal to produce a second product signal, the first and second product signals being combined and integrated by a predetermined factor to produce the second control signal.

Another aspect of the present invention is that the digital signal is split into an in-phase signal and a quadrature signal, and the feed-forward equalizer further includes an in-phase feed-forward equalizer for processing the in-phase signal and a quadrature feed-forward equalizer for processing the quadrature signal, and wherein the first error signal is an in-phase error signal and the second error signal is a quadrature error signal and the first data signal is an in-phase data signal and the second data signal is a quadrature data signal.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention provides a phase-locked loop and method that is implemented using current CMOS circuit technology and which is highly effective in eliminating re-activation. Particularly, the phase-locked loop system and method is effective for a system which uses carrierless AM/PM (CAP) or quadrature amplitude modulation (QAM) line code.

Figure 3:
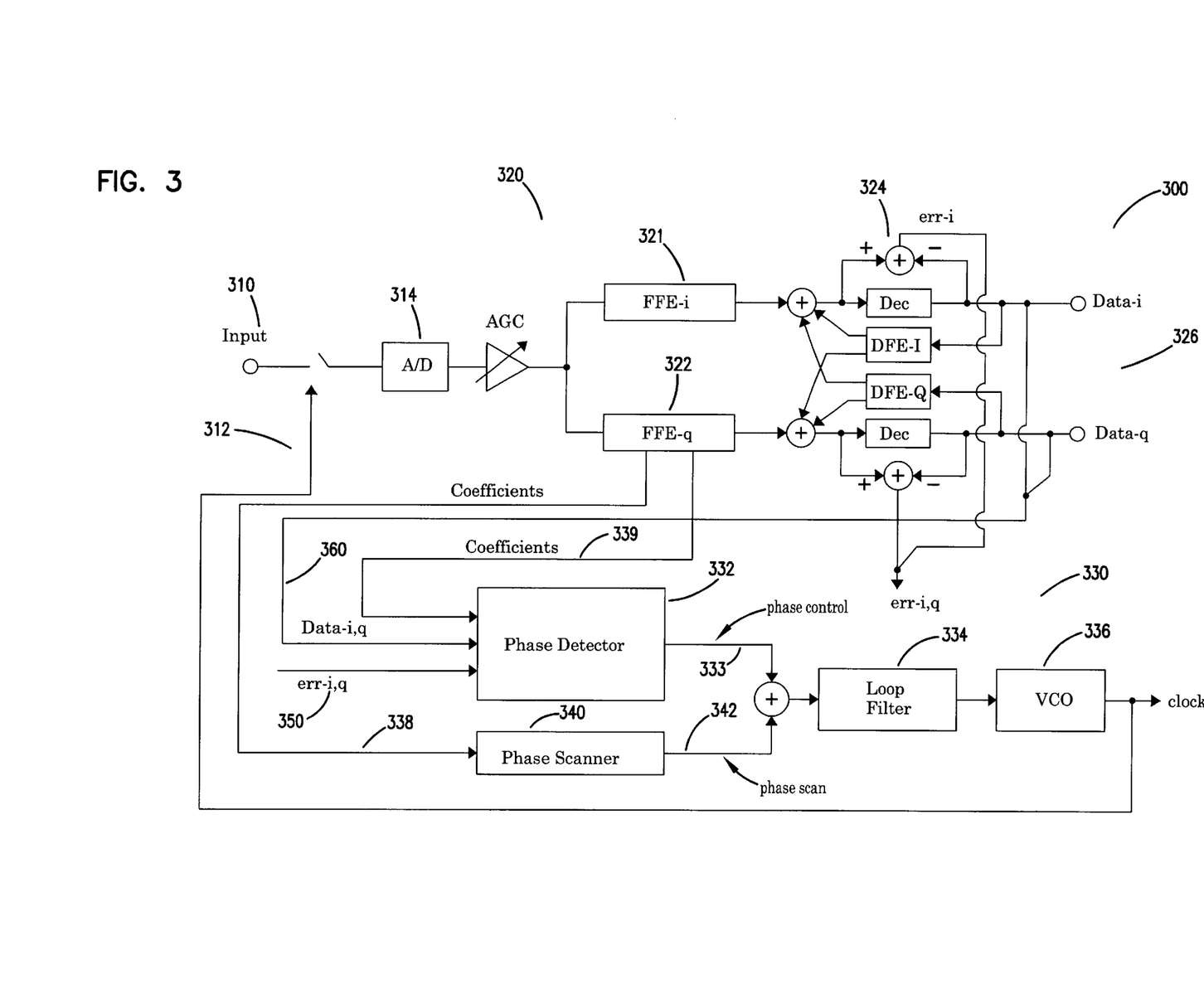
FIG. 3 illustrates a block diagram of the timing recovery system according to the present invention.

FIG. 3 illustrates a block diagram of the timing recovery system 300 according to the present invention. The timing recovery system 300 samples an input signal 310 according to a derived clock signal 312. The sampled input signal 310 is then provided to an analog-to-digital converter 314. The digital output of the analog-to-digital converter 314 is passed through to a feed-forward equalizer 320 and a decision feedback equalizer 324 to produce the output data 326. The feed forward equalizer 320 adapts to the line response so that the node immediately prior to the decision feedback equalizer (DEE) 324 sees no precursor intersymbol interference (ISI) which cannot be cancelled.

The output of the feed-forward equalizer 320 also provides an input to a phase-locked loop 330. The output of the feed-forward equalizer 320 is provided to a phase detector 332 for generating a phase control signal 333 that is provided to a loop filter 334. The loop filter 334 controls a voltage-controlled oscillator 336 to generate the clock signal. However, in the timing recovery circuit 300 of FIG. 3, coefficients 338 from the feed-forward equalizer 320 are passed to a phase scanner 340 that provides a phase scan signal 342 which is combined with the phase control signal 333 from the phase detector 332.

The main phase detector 332 creates the useful timing information from the several tap coefficient values 339 in the feed-forward equalizer 320, error signals 350, and recovered data 360. The phase scanner 340 monitors the relation between feed-forward equalizer coefficient values 338 and when the phase scanner 340 judges that the coefficient values 338 are in the wrong state, the phase scanner 340 forces the phase-locked loop 330 to create a phase jump to eliminate the phase-locked loop from being stuck at the wrong stable phase.

Two control signals 333, 342 from the main phase detector 332 and phase scanner 340, respectively, are added together and fed to the loop filter 334 to drive the voltage control oscillator 336. The controlled clock signal 312 is then used to determine the sampling instance of the input signal 310 which is quantized by the A/D converter 314.

Figure 4A:
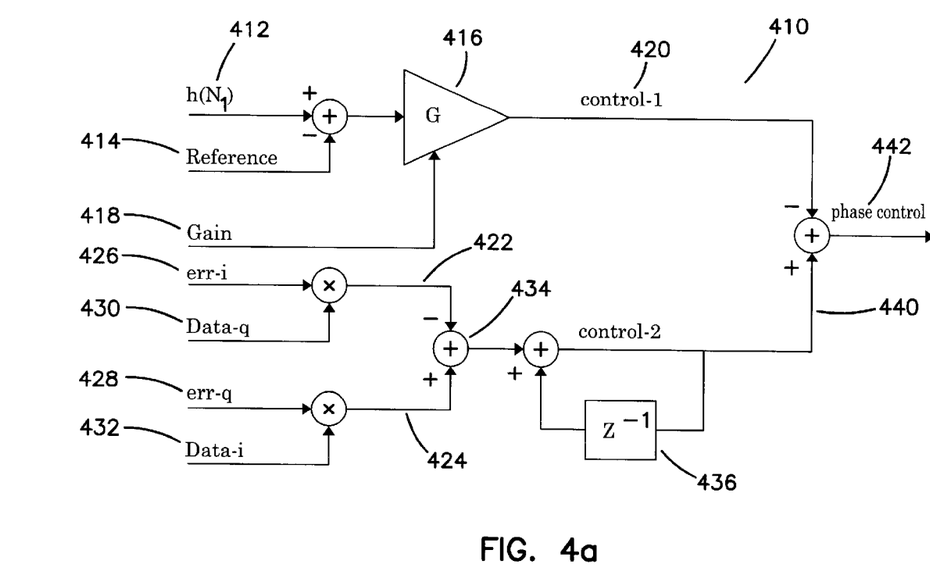
FIGS. 4a and 4b illustrated the detail block diagrams for the main phase detector and the phase scanner respectively.
Figure 4B:
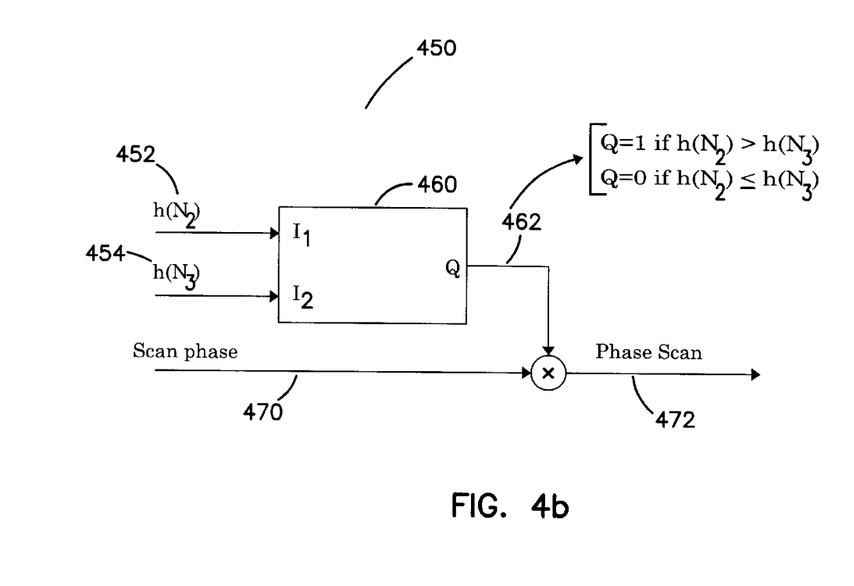

FIGS. 4a and 4b illustrate the detail block diagrams for the main phase detector 410 and the phase scanner 450, respectively. In FIG. 4a, by way of example, only one feed-forward equalizer coefficient 412, H(nl), is used in the phase detector 410. The reference value 414, REF, is subtracted from coefficient H(nl) 412 which is then multiplied by the amplifier 416 by a gain factor 418, G. This process creates one of the two control signals, control-1 420.

On the other hand, the two products 422, 424 are calculated from the combination of err-i 426, err-q 428, data-i 430, and data-q 432. The two products 422, 424 are added 434 and integrated 436 by a factor, Z to generate the second control signal, control-2 440. The second control signal, control-2 440, is added with control-1 to form the final phase control signal 442 at the output of phase detector 410.

FIG. 4b illustrates a detailed embodiment for the phase scanner 450. In FIG. 4b, two coefficients 452, 454 are compared in comparator 460. The output 462 of the comparator 460 is a logic one if the first coefficient 452 to the comparator 460 is greater than the second coefficient 454 to the comparator 460. The output 462 of the comparator 460 is a logic zero if the first coefficient 452 to the comparator 460 is less than or equal to the second coefficient 454 to the comparator 460. The output 462 of the comparator 460 is mixed with the scan phase 470 to generate the phase scan control signal 472.

Figure 5:
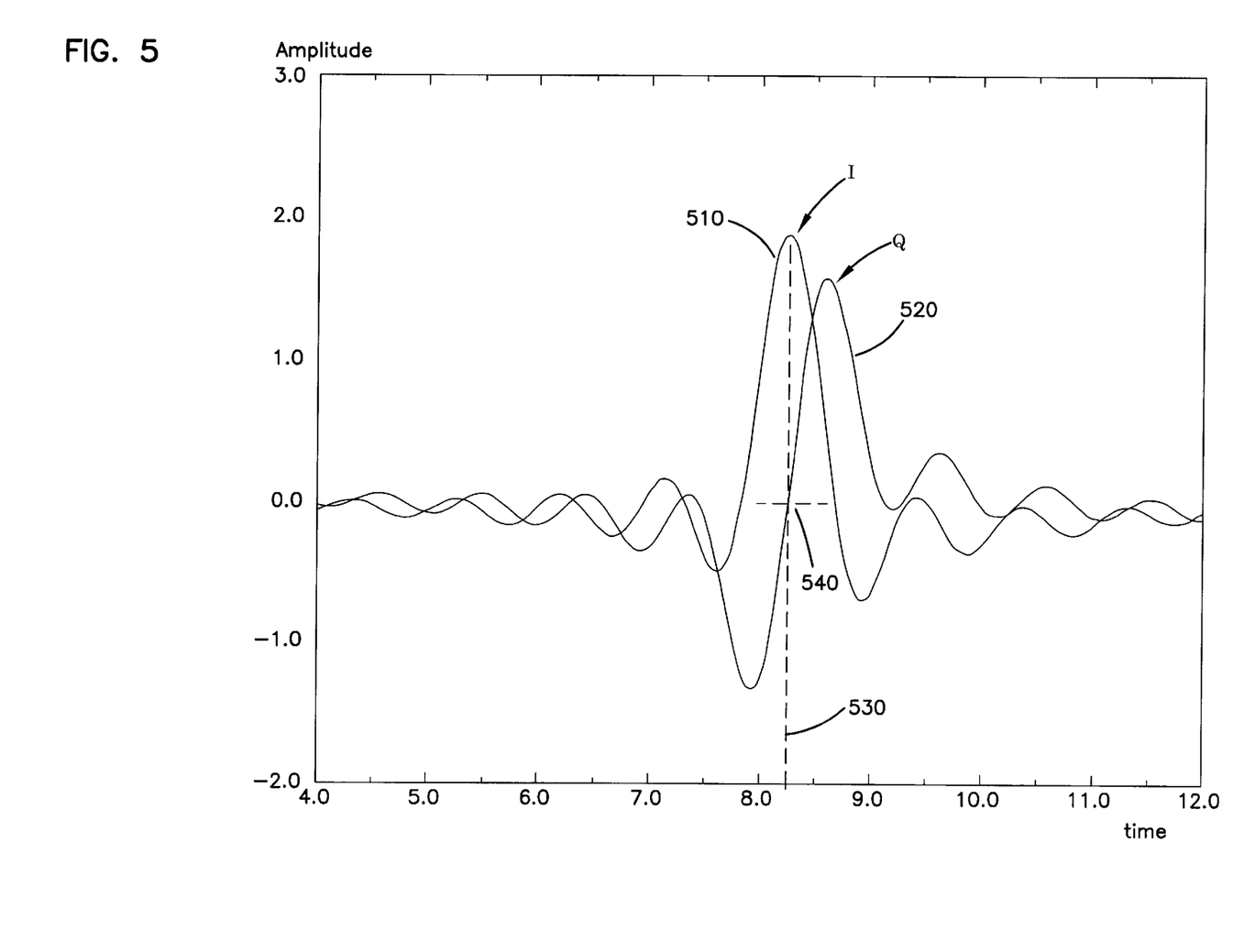
FIG. 5 shows that CAP isolated pulses for I and Q pulses.

FIG. 5 shows that CAP isolated pulses for I 510 and Q 520 pulses. These pulses 510, 520 are fed to the two parallel feed-forward equalizers, FFE-i 321 and FFE-q 322, respectively, as shown in FIG. 3.

Figure 6:
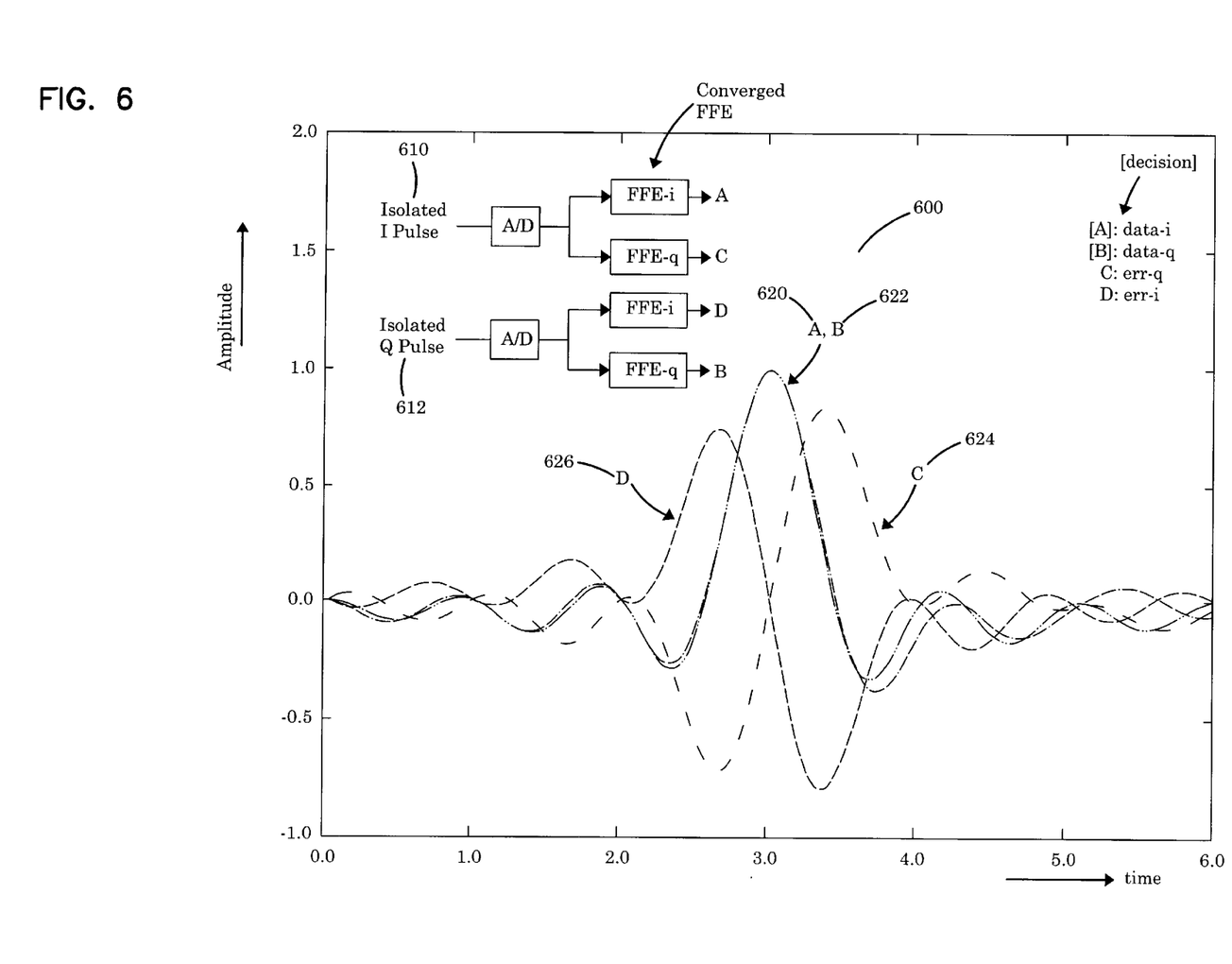
FIG. 6 illustrates the waveforms for the outputs of FFE-i and FFE-q of FIG. 3.

The waveforms 600 shown in FIG. 6 are the outputs of FFE-i 321 and FFE-q 322 of FIG. 3 for those CAP isolated pulses. For example, for the case for the null cable and after feed-forward equalizers are converged, CAP I and Q isolated pulses are fed at different times and plotted on the same time axis. As can be seen in this figure, plot A 620 and C 624 are the output of FFE-I 321 and FFE-q 322 when I pulse is sent and plot B 622 and D 626 are FFE-q 321 and FFE-I 322 outputs driven by the CAP Q pulse. FIG. 6 demonstrates that the timing information is created by the combination of products as shown below in equation 1.

$$\text{Timing Information} = err\text{-}q * out\text{-}i - err\text{-}i * out\text{-}q \qquad \text{Eqn. 1}$$

Figure 7:
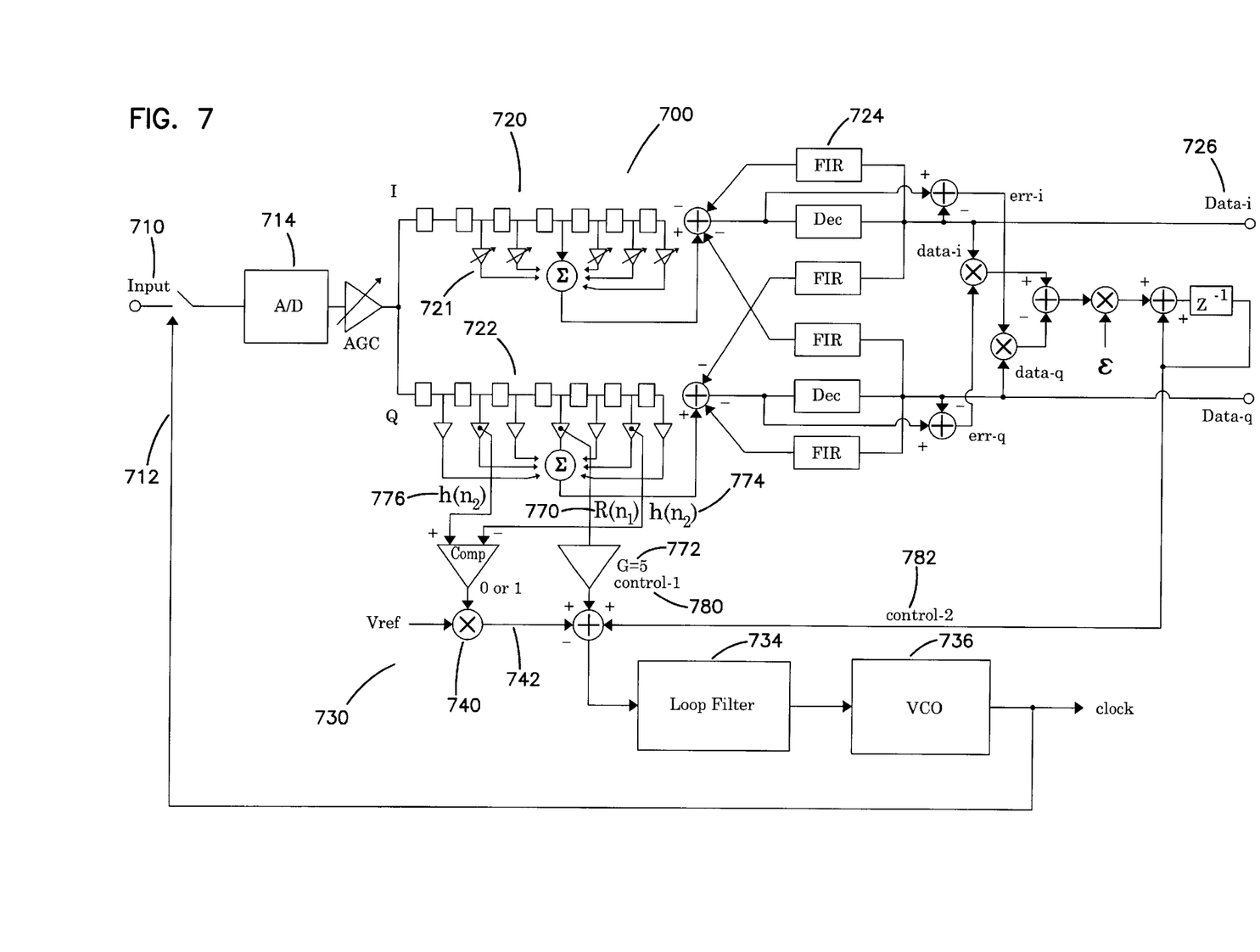
FIG. 7 illustrates a detailed circuit diagram of a timing recovery circuit according to the present invention.

FIG. 7 illustrates a detailed circuit diagram of a timing recovery circuit 700 according to the present invention. In FIG. 7, the center tap of the FFE-q 722 is used for the H(n1) 770 previously described in FIG. 4a and Reference is set to zero. The gain 772, G, is set to 5.0. The comparison of +/−2 tap positions 774, 776 of FFE-q 721 is used to drive the Phase Scanner 740 as described in FIG. 4b. The control of AGC is performed according to equation 2:

$$AGC = AGC - (err\text{-}i * out\text{-}i + err\text{-}q * out\text{-}q)/2 * *mue \qquad \text{Eqn. 2}$$

where AGC is the AGC gain, and mue is typically selected to be in a range between 14 and 20.

As shown in FIG. 7, the phase scanner 740 is used to eliminate the problem of dual phase error compensations. The phase scanner 740 forces the feed-forward equalizer 720 not to make a phase compensation. This can be done by monitoring the two feed-forward equalizer FFE-q 722 coefficient values: (H(n3)) 776 and (H(n2)) 774. This can be explained by looking at FIG. 5.

If the best timing phase is assumed to be the top of the I-signal, around t=8.2 530, from the nature of the CAP signal, in this example, the Q-signal has zero-crossing 540 at around this optimal timing phase. When the feed-forward equalizer tries to compensate the phase error from this optimal timing, feed-forward equalizer coefficients shown in FIG. 7, H(n2) 774 and H(n3) 776 will change their values. For example, when the phase is delayed, the H(n2) 774 value becomes bigger and H(n3) 776 becomes smaller. The scan control 740 uses these characteristics and when the phase scanner 740 detects that the feed-forward equalizer FFE-q 722 has over-compensated for the phase error, the phase scanner 740 sends an output 742 which is added to phase control signals control-1 780 and control-2 782. Thus, the scan control eliminates dual phase error compensation.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A timing recovery circuit, comprising:

a phase scanner for determining when phase over-compensation has occurred and generating a signal for preventing phase over-compensation in response thereto thereby providing an accurate recovered clock signal;

a feed-forward equalizer having a plurality of taps providing coefficients for filtering and adapting the input timing recovery circuit to an input signal;

a phase detector for sampling the coefficients from the feed-forward equalizer, error signals and output data and generating a phase signal used to generating the recovered clock signal; and wherein the signal for preventing phase over-compensation is mixed with the phase signal to generate the recovered clock signal.

2. The timing recovery circuit of claim 1, wherein the phase scanner compares the tap coefficients to generate signal for preventing phase over-compensation by the feed-forward equalizer.

3. The timing recovery circuit of claim 1, wherein the feed-forward equalizer is a fractionally spaced feed-forward equalizer.

4. The timing recovery circuit of claim 1, wherein the phase scanner further comprises a comparator for comparing two taps from the feed-forward equalizer to generate a comparator output signal indicating whether over-compensation by the feed-forward equalizer has occurred, the comparator output signal being mixed with a scan phase signal to generate the signal for preventing phase over-compensation by the feed-forward equalizer.

5. The timing recovery circuit of claim 1 wherein the phase detector further comprises a first circuit for processing a center tap from the feed-forward equalizer and a reference signal to generate a first control signal and a second circuit for processing the error signals and the data output signal to generate a second control signal, the first and second control signal being combined to produce the phase control signal.

6. The timing recovery circuit of claim 5 wherein the second circuit further comprises a first mixer for combining a first error signal and a first data signal to produce a first product signal and a second mixer for combining a second error signal and a second data signal to produce a second product signal, the first and second product signal being combined and integrated by a predetermined factor to produce the second control signal.

7. The timing recovery circuit of claim 6 wherein the digital signal is split into a in-phase and quadrature signal, and the feed-forward equalizer further comprising an in-phase feed-forward equalizer for processing the in-phase signal and a quadrature feed-forward equalizer for processing the quadrature signal, and wherein the first error signal is an in-phase error signal and the second error signal is a quadrature error signal and the first data signal is an in-phase data signal and the second data signal is a quadrature data signal.

8. A timing recovery circuit, comprising:
  a switch for sampling an incoming line code signal, the switch sampling the incoming signal according to a recovered clock signal;
  an analog-to-digital converter, coupled to the switch, for converting the incoming line code signal to a digital signal;
  a feed forward equalizing means, coupled to the analog-to-digital converter, for receiving the digital signal and for filtering the incoming signal, wherein the feed-forward equalizer includes a plurality of taps and the feed-forward equalizer filtering the input signal to adapted the input signal to the line code;
  a decision feedback equalizer, coupled to the feed forward equalizer, for cancelling intersymbol interference in the filtered signal and generating error signals and a data output signal; and
  a phase-locked loop, coupled to the feed forward equalizer, for generating the recovered clock signal in response to a signal received from the feed forward equalizer, the phase-locked loop further comprising:
  a phase detector for generating a phase signal based upon tap coefficients from the feed forward equalizer, and error signals and a data output from the decision feedback equalizer; and
  a phase scanner, coupled to the feed-forward equalizer, for determining when phase over-compensation has occurred and generating a signal for preventing phase over-compensation in response thereto, the phase signal and the signal for preventing phase over-compensation being combined to derive a recovered clock signal.

9. The timing recovery circuit of claim 8, wherein the phase-locked loop further comprises a loop filter and a voltage controlled oscillator, the combination of the phase signal and the signal for preventing phase over-compensation driving the loop filter and voltage controlled oscillator to generate the recovered clock signal.

10. The timing recovery circuit of claim 8 wherein the feed-forward equalizer is a fractionally spaced feed-forward equalizer.

11. The timing recovery circuit of claim wherein the phase scanner further comprises a comparator for comparing two taps from the feed-forward equalizer to generate a comparator output signal indicating whether over-compensation by the feed-forward equalizer has occurred, the comparator output signal being mixed with a scan phase signal to generate the signal for preventing phase over-compensation by the feed-forward equalizer.

12. The timing recovery circuit of claim 11 wherein the phase detector further comprises a first circuit for processing a center tap from the feed-forward equalizer and a reference signal to generate a first control signal and a second circuit for processing the error signals and the data output signal to generate a second control signal, the first and second control signal being combined to produce the phase control signal.

13. The timing recovery circuit of claim 12 wherein the second circuit further comprises a first mixer for combining a first error signal and a first data signal to produce a first product signal and a second mixer for combining a second error signal and a second data signal to produce a second product signal, the first and second product signal being combined and integrated by a predetermined factor to produce the second control signal.

14. The timing recovery circuit of claim 13 wherein the digital signal is split into a in-phase and quadrature signal, and the feed-forward equalizer further comprising an in-phase feed-forward equalizer for processing the in-phase signal and a quadrature feed-forward equalizer for processing the quadrature signal, and wherein the first error signal is an in-phase error signal and the second error signal is a quadrature error signal and the first data signal is an in-phase data signal and the second data signal is a quadrature data signal.

15. A method for recovering a clock signal from an input signal, comprising the steps of:
  receiving an input signal;
  filtering the input signal to generate a data signal, sampling the filtered input signal to determine when phase over-compensation has occurred;
  generating a signal for preventing phase over-compensation in response to the determination that the filtered input signal has been phase over-compensated; and
  mixing the signal for preventing phase over-compensation with a phase signal to generate a recovered clock signal.

16. The method of claim 15 wherein the step of filtering the input signal further comprises the step of generating a plurality of taps providing tap coefficients.

17. The method of claim 14 wherein the step of sampling the filtered input signal to determine when phase over-compensation has occurred further comprises the steps of sampling coefficients and generating a phase scan signal, the phase scan signal being used to generate the recovered clock signal.

* * * * *

UNITED STATES PATENT AND TRADEMARK OFFICE
CERTIFICATE OF CORRECTION

PATENT NO.    : 6,249,557 B1
DATED         : June 19, 2001
INVENTOR(S)   : Hiroshi Takatori It is certified that error appears in the above-identified patent and that said Letters Patent is hereby corrected as shown below:

Column 1,
Lines 6-7, "1. Field of the invention" should be its own heading
Lines 12-13, "2. Description of Related Art" should be its own heading Column 4,
Line 5, "illustrated" should read -- illustrate --

Column 6,
Line 58, "claim 1" should read -- claim 4 --

Column 8,
Line 1, "claim wherein" should read -- claim 8 wherein --
Line 50, "claim 14" should read -- claim 16 --

Signed and Sealed this

Sixth Day of August, 2002

*Attest:*

*Attesting Officer*

JAMES E. ROGAN
*Director of the United States Patent and Trademark Office*